May 20, 1969
R. HESSENBRUCH
3,444,683
MANUFACTURE OF ENDLESS THREADLIKE PRODUCTS
OF THERMOPLASTIC MATERIALS
Filed July 17, 1967
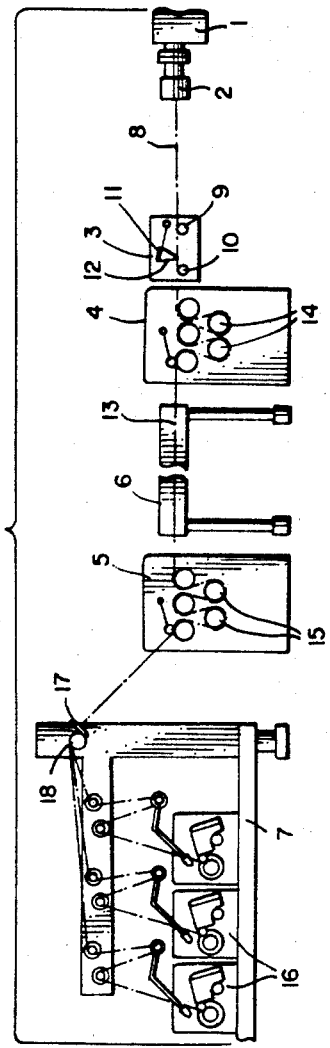
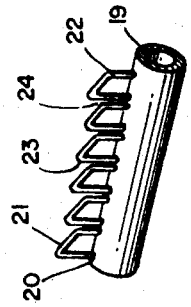
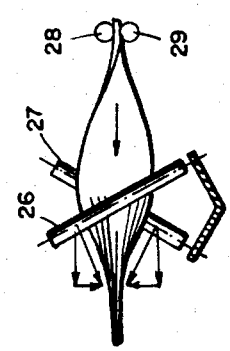
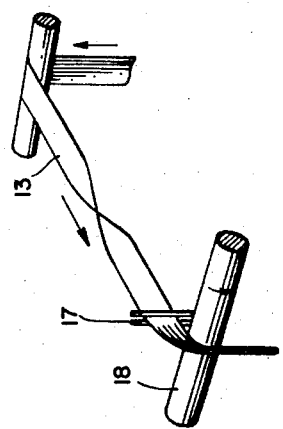
INVENTOR:
ROLF HESSENBRUCH
BY
Marzall, Johnston, Cook & Root
ATT'YS United States Patent Office 3,444,683
Patented May 20, 1969

3,444,683
MANUFACTURE OF ENDLESS THREAD-
LIKE PRODUCTS OF THERMOPLASTIC
MATERIALS
Rolf Hessenbruch, Remscheid, Germany, assignor to Barmag Barmer Maschinenfabrik Aktiengesellschaft, Wuppertal, Germany
Filed July 17, 1967, Ser. No. 653,694
Claims priority, application Germany, July 23, 1966, B 88,153
Int. Cl. D02g 3/06; D01h 13/04; B29f 3/08
U.S. Cl. 57—157                                    5 Claims

ABSTRACT OF THE DISCLOSURE

A method of winding or spooling unsplit or partly split strips of thermoplastic materials. In the method thin, wide strips of thermoplastic materials which have been stretched and are suitable for splitting or cutting into threadlike products are compressed across their width in an open guide to form threadlike products of compact cross-section having nearly elliptical or round shape. The compacted strips can be fixed by heat treatment if such is desired. The process makes it possible to wind the unsplit or partly split strips with good thread deposit and withdrawal characteristics.

---

The present invention relates to a process for the production of endless thread-type structures from thermoplastic materials, according to which a film is cut into longitudinal strips and the film strips in passing through a stretching zone, especially under action of heat, are stretched monoaxially to a multiple of their original length, split if need be, and thereupon wound on pirn tubes.

The production of such wholly or partially split or unsplit thread structures is substantially described in German Patents 667,234, 763,277 and 913,574 as well as in German published applications 1,142,987 and 1,195,428. It is possible in this manner to produce such thread structures from practically all thermoplasts.

The production of plastic threads from flat film strips presents substantial advantages in many respects. Thus it is simpler to produce flat or blown films from which the film strips are cut, by screw extrusion presses than it is to spin a corresponding number of monofiles because the extrusion press tools can be laid out more favorably from the viewpoint of flow technique. Moreover, by a simple adjustment of the nozzle gap it is possible to change to any desired denier. On the other hand, by a corresponding modification of the strip width it is likewise possible to produce any desired denier. Obviously, it is also possible to use both measures at the same time.

The surface of the film strips is considerably greater than that of round monofiles with like volume. This causes a more rapid and more uniform heating of the film strips in the stretching zone. A more homogeneous orientation of the macromolecules in the longitudinal direction is produced along with a higher stretching ratio and, accordingly, a greater tensile strength.

Film strips are more suited for splitting the more they are stretched and the thinner they are. The splitting, which is aided by a transverse or torsional stress exerted on them, gives the product the character of fiber strips which can be processed to yarn for weaving twine or rope strands, especially for the manufacture of rugs, bags, ropes, etc.

In principle there can be produced on the same installation thread-type structures of any desired denier, it being necessary expediently for the aforementioned reasons to use or to produce as thin as possible an original film and to cut this into corresponding wide strips so that after their stretching there will result bands of, for example, only 0.02 to 0.08 mm. in thickness, but 4 to 40 mm. or more in width.

The winding of these thread-type structures takes place —if they have been split—ordinarily only after a yarn-like binding has been formed by twisting. In the process the split band material is locked together into a round cross-sectional contour and the winding of such round threads or yarns presents no difficulties. Easy winding is likewise possible if the split material is provided merely with a slight protective twist.

The winding of thin and wide strips of nonfibrous material is carried out likewise without complications if, as in U.S. Patent 1,994,057, after treatment with a swelling agent, it is drawn, before the winding, in the twisting process through a compressor nozzle in which the strip is rolled together into a circular cross-section.

On the other hand, the winding of undeformed bands not yet or only partially split presents considerable difficulties because of their thin rectangular cross-sectional form, which difficulties increase rapidly with an enlargement of the band width. The winding of such flat thread-type structures leads in the preferred thread deposit in so-called random winding to a disturbed layer construction and to an extremely bumpy winding surface which, in turn, is a cause of jammings and breakages in the thread draw-off.

Therefore, flat, threadlike products have to be wound in so-called precision windings with strip windings in the same lay of strips at the same space of the winding sleeve because only this method will result in smooth angular surfaces. These are deposits where the windings of the return stroke cover exactly the space between the windings of the previous stroke. This means that the lead angle of the strip deposit has to be adjusted in an inconvenient and time consuming way for each change in strip width.

Another disadvantage found in winding or spooling flat strips is the tendency of the strips to jump the guide member. This problem increases with the increase in width of the strip. The increase in spool drive energy is also mentioned as a disadvantage for the spooling of flat strips.

In U.S. Patent 1,986,979 it is suggested that the wide, flat strips be folded and thus doubled immediately before entering the spinning deposit. In this process the strip is pulled over a V-shaped groove while the longitudinal axis of the strip is aligned with the bottom of the groove. This treatment, however, retains the rectangular cross-section of the strip even though the width is now reduced and, for this reason, the above mentioned problems in spooling of these strips are still present.

The same holds true when the strip is irregularly folded in a longitudinal direction as is described in German Patent 1,127,535. This process includes a stretching operation after a folding operation using a heating nozzle. Such a nozzle folds the original strip to one-half or one-third of the original width. The subsequent stretching process gives the strip a thin rectangular cross-section. The slight increase in thickness due to the folding is unimportant and the described difficulties in spooling of the strip of thin rectangular cross-sectional form are retained.

Untwisted threadlike products of unsplit or partly split strips are interesting, however, for many processes and it is, therefore, necessary that such products be wound on spools with good thread deposit and withdrawal characteristics.

The principal object of the present invention is to provide a method of treating or shaping wide sheet or film strips of thermoplastic materials stretched as thin as possible which are suited for splitting and to deform or pretreat these without twisting to such a state that they are suitable for perfect winding onto spools and also to allow further processing from the wound spools without difficulties.

To obtain this result, the stretched strip which is suitable for splitting is compressed in its width in an open guide into a threadlike product of compact cross-section having a nearly elliptical or round shape which can, if desired, be fixed by a heat treatment. This compression takes place at a thread velocity in the range of the winding velocity onto the spool. The compression takes place at a point in the strip passage where its velocity corresponds to the winding velocity because at this point the fixing effect taking place automatically with tensions of each stretching or shrinking operation have ended. It is not possible, therefore, to fix the temporary flattening of the previously compressed, rounded cross-section by an immediately following run of the creased strip over bent plates. The film strip instead expands back to its original cross-section immediately after passing the bent plates. The guiding device for compressing of the strip can be placed immediately ahead of the last godet set or within or after said set. In special cases it can be arranged in the area of the winding device or the run-off point.

In devices for the manufacturing of threadlike products from film strips in which a stretching mechanism is followed by the winding part, the winding speed corresponds to the highest speed of the film strip course as it comes from the stretching. In a device with a shrinking element between the stretching unit and the winding unit, however, the winding speed corresponds to the running speed of the film strip at the end of the shrinking section. This running speed is slower by the difference between the entering and exit speed in the shrinking element of the device.

The compressing of the strip can be carried out, in further development of the invention, in such a way that the film strip, at first conducted flat and, possibly, twisted in its running plane by about 90°, is conducted under tension, on edge, and in deflection of its running direction, over a runover or deflection body, possibly heated, stationary or revolving, situated transversely to the running direction, in which process the cross-sectional compression is accomplished by tensional forces acting in the direction of the strip width. The compressing of the film strip can, however, also be achieved by the means that the film strip, at first conducted flat, is passed under tension between two turnable run-over rollers, arranged at a slight, possibly adjustable, distance apart, crossing transversely to the strip running plane. In this arrangement the cross-sectional compression is accomplished by the velocity components of the run-over rollers aimed in the direction of the strip width toward the strip center.

Strips compressed in this fashion can be wound in the same manner as round threads and without forcing a twist into the material. Under certain circumstances a specific fixing process can be used to retain this shape. The nearly elliptical shape or rounded cross-section of the strip so compressed allows spooling on devices of generally known design, for example, devices such as are described in DBP 1,028,669 or DAS 1,214,824. The spool velocity has to be regulated at the precision desired for the further processing in dependence on their particular tension into cross windings or to elongated coplike bobbin bodies of any desired type of distribution.

It has been found that the type of twistless cross-sectional compression according to the invention results in a rounded cross-sectional contour with a constant and equal cross-section regardless of the width of the bands. This is especially of importance for stretching bands of relatively great width (say, from 10 mm. upward and especially from 25 mm. upward), which previously were especially difficult to spool.

Since the cross-sectional shaping for the purpose of avoiding pressing together into a narrow rectangular state as well as its fixing is carried out, according to the invention, only after the stretching of the film strips and the fixing effect necessarily occurring simultaneously with it, it follows that the film strips are completely flat and uncreased during the stretching and, accordingly, have the maximum possible heat transfer area so that a more rapid and more uniform heating takes place and a more homogeneous orientation of the macromolecules is achieved. Furthermore, the thread-type structures cross-sectionally shaped according to the invention immediately give up again their temporarily forced cross-sectional flattening in passage over curved surfaces, such as rollers or rolls, and can again elastically recover their previous rounded cross-sectional contour.

Simultaneously it can be achieved by the choice of the degree of stretching that in the concentrating of the cross-section into elliptical or rounded contour a splitting takes place, just begins or is entirely avoided, in which connection the well-known experience applies that as the stretching increases the tendency to split increases.

The use of an open guide to crease the cross-sectional width of the stretched band and to form a compact cross-section makes possible, in the event of breakage of a band, a rapid and independent reapplying to the bobbin and an easy introduction into the guide device, so that in operation no disturbances can occur through the breaking of a band.

In the drawing there is schematically represented an example of an installation for carrying out the process of the invention.

FIG. 1 shows the whole installation for the continuous production of endless thread-type structures from a thermoplastic synthetic film web with the devices for the concentrating and, if need be, splitting of the strips cut from the film web and stretched, as well as for the winding of the thread structure; and FIGS. 2, 3, and 4 show devices for the compressing and, if need be, splitting, of the stretched film strips according to FIG. 1 on a larger scale.

According to FIG. 1 the usual installation consists essentially of worm extrusion press 1 with wide-slit nozzle 2, of cutting device 3, guide roller supports 4 and 5 along with heating passage 6, as well as of winding device 7. With the aid of this installation the manner of operation and execution of the process of the invention will be explained.

Film web 8 emerging from wide-slit nozzle 2 in a still plastic state is solidified in running over tension rollers 9, 10 to such an extent that it can be cut by blades 12 mounted on swingable cutter beam 11 into strips 13. These strips 13 are conducted onward through the stretching zone, which, in a known manner, is formed of godets 14 and 15 and a heating device 6 arranged between them. The turning rate of godets 14 is adjusted in such a way with respect to the extrusion delivery speed of the film web 8 that in the region of tension rollers 9, 10 this undergoes the tensioning necessary for clean cutting. Godets 15 run at an increased speed with respect to godets 14, which determines the degree of stretching of strips 13 in heating zone 6 and can lie in the range of 1:4 to 1:12 or higher. From the stretching mechanism 4, 5, 6 the stretched film strips are conducted to the winding device 7, which has a number of pirning heads 16 corresponding to the number of strips, the structure and functioning of which pirning heads are described in detail in German Patent 1,028,669.

According to the invention, the flat-conducted stretched strips are compressed before the winding into a thread-type structure of compact cross-section with approximately elliptical or rounded contour. This takes place, as is represented in more detail in FIGS. 1 and 2, in the manner that the strip which is at first flat is twisted in its running plane by about 90°, for which purpose it is conducted, for example, through a comblike guide 17. Thereupon it is conducted on edge and in deflection of its running direction downward under tension over a stationary or turning run-over or deflection body 18 lying transversely to the running direction, in which the compression takes place through the pull forces acting in the direction of the transverse axis of the strip.

Such a compressed structure, in contrast to the original flat film strip of very slight thickness but great width, can be spooled untwisted at a turning rate regulated by its particular tension into faultless cross windings or large cops of any desired type of distribution, especially in so-called parallel winding.

In FIG. 3 there is represented an example of a combination directional change member and comb guide of a special type, which brings about in a simple manner the twisting of the strip and its compression. The fixed tube 19 is provided with a row of bores 20 into which there are inserted at a short distance apart so-called hair-needles 21 bent to a certain shape depending on the particular use, both of whose shanks 22 and 23 stand perpendicularly on the tube 19 and project from this by at least the film strip width, the one shank 23 being bent off in its upper part in such a way that the film strip can be more easily introduced into the narrow slot 24 between two such needles.

The run-over or direction change body 18 or 19 can, if desired, be equipped with a heating element, if a fixing of the thread structure concentrated into a rounded cross-sectional contour is desired. But care must be taken that between the run-over or deflection body and possibly following rollers or pulleys there is present a sufficiently great distance in which the fixing of the cross-sectional form can be completed.

In FIG. 4 there is represented a further example of a device for the compression of a film strip which tends to split open in which the compressing of the at first flat-stretched film strip is accomplished by velocity components of the run-over rollers aimed in the direction of the strip width toward the strip center, which act on it in the running over the two turnably arranged rollers 26 and 27 crossed transversely to the strip course plane. These rollers 26 and 27 can have a matte to highly polished surface, which is dependent on the film material and the degree of stretching. It was found that in the case of film strips tending to split open, that is, after relatively high stretching, a matted surface is to be recommended, while a surface of high luster polish is to be preferred for less-stretched bands which do not yet tend to split open. In the latter case there is obtained a special glassy surface effect on the bands. There is no need of a special drive for the rollers, since these are carried along by the film strips and kept in rotation. The effect of the device represented can be strengthened by the method that before the crossed rollers 26, 27 there are arranged at a relatively short distance apart guide rollers 28, 29, though there is imposed upon the bands between the two roller pairs a winding around its longitudinal axis, which, in turn, brings about an intensive contact of the band against rollers 26, 27, so that there sets in a strengthening of the transverse concentration of the band.

There should also be provided between godet block 5 and the winding 7 a shrinkage interval. There would then be arranged at the end of the shrinkage interval provided with a heating device a godet set similar to the godet block 5, whose circumferential velocity, however, is lower in correspondence to the degree of shrinking of the band than that of godet set 5. The devices described earlier in the drawing for the concentrating of the band into a compact cross-section with approximately elliptical or rounded cross-sectional contour would then be situated in the zone of this last godet set.

I claim:
1. In a process for the production of endless thread-like structures of thermoplastic materials wherein a thermoplastic film is cut into longitudinal strips and the film strips in passing through a stretching zone are monoaxially stretched by a multiple of their original length and are thereupon wound onto pirn tubes, the improvement which comprises: passing said film strips before they are wound at a speed in the range of the winding speed through an open guide, conducting said strips on edge over a deflection body lying transversely to the running direction, the cross-sectional compression being accomplished by tensional forces acting in the direction of the strip width, wherein said strips are pressed together into a threadlike structure of compact cross-section with approximately elliptical or rounded cross-sectional contour.

2. A process as in claim 1 wherein said film strips are passed through the stretching zone under the action of heat, wherein the monoaxially stretched strips are split and wherein the threadlike compressed strips are fixed in this state by a heat treatment.

3. A process as in claim 2 wherein the deflection body is heated.

4. A process as in claim 1 wherein the film strip is deflected in its running plane by about 90° and is thereby conducted on edge to the open guide.

5. In a process for the production of endless thread-like structures of thermoplastic materials wherein a thermoplastic film is cut into longitudinal strips and the film strips in passing through a stretching zone are monoaxially stretched by a multiple of their original length and are thereupon wound onto pirn tubes, the improvement which comprises: passing said strip under tension between two turnable run-over rollers, said rollers being crossed transversely to the strip running plane, a cross-sectional concentration being accomplished by the velocity components of the run-over rollers aimed in the direction of the strip width toward the strip center, whereby said strip collapses into a threadlike structure of compact cross-section.

References Cited
UNITED STATES PATENTS

| 868,193 | 10/1907 | Leinveber | 57—31 |
| 1,585,617 | 5/1926 | Heany | 57—154 |
| 1,994,057 | 3/1935 | Wallach | 57—154 |
| 2,728,950 | 1/1956 | Annesser | 264—147 |
| 2,883,822 | 4/1959 | Dorschner | 57—31 |
| 3,003,304 | 10/1961 | Rasmussen | 57—157 |
| 3,164,948 | 1/1965 | Stratford | 57—157 XR |
| 3,193,904 | 7/1965 | Evans et al. | 57—31 XR |

STANLEY N. GILREATH, *Primary Examiner.*

WERNER H. SCHROEDER, *Assistant Examiner.*

U.S. Cl. X.R.

57—31, 106, 167; 264—147